United States Patent
Schoon

(10) Patent No.: US 10,550,861 B2
(45) Date of Patent: Feb. 4, 2020

(54) MANUALLY ADJUSTABLE POPPET VALVES FOR A POWER ASSIST STEERING GEAR

(71) Applicant: TRW Automotive U.S. LLC, Livonia, MI (US)

(72) Inventor: Benjamin W. Schoon, Lafayette, IN (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 99 days.

(21) Appl. No.: 15/790,120

(22) Filed: Oct. 23, 2017

(65) Prior Publication Data

US 2019/0120259 A1    Apr. 25, 2019

(51) Int. Cl.
   *F15B 13/02*   (2006.01)
   *B62D 5/08*    (2006.01)
   *B62D 5/06*    (2006.01)
   *F16K 17/04*   (2006.01)

(52) U.S. Cl.
   CPC ............ *F15B 13/024* (2013.01); *B62D 5/062* (2013.01); *B62D 5/081* (2013.01); *F16K 17/04* (2013.01)

(58) Field of Classification Search
   CPC .... F15B 15/225; F15B 15/204; F15B 13/024; B62D 5/061; B62D 5/062; B62D 5/081

USPC ........................................................... 91/368
   See application file for complete search history.

(56) References Cited

U.S. PATENT DOCUMENTS 5,562,017 A * 10/1996 Wuenscher ............ B62D 5/061
                                                29/888.048

\* cited by examiner

*Primary Examiner* — Michael Leslie
*Assistant Examiner* — Daniel S Collins
(74) *Attorney, Agent, or Firm* — Tarolli, Sundheim, Covell & Tummino LLP

(57) ABSTRACT

A steering gear includes a housing defining a chamber. A piston divides the chamber into first and second chamber portions. The piston is moveable along a linear axis relative to the housing upon pressurization of fluid in one of the first and second chamber portions. A pressure relief vents pressurized fluid from one of the first and second chamber portions to one other of the first and second chamber portions upon movement of the piston to a predetermined position. The pressure relief assembly includes a first valve at a first end of the pressure relief assembly and a second valve at a second end of the pressure relief assembly. The pressure relief assembly is axially movable relative to the piston to adjust the position of the first valve and the second valve relative to the piston.

15 Claims, 3 Drawing Sheets

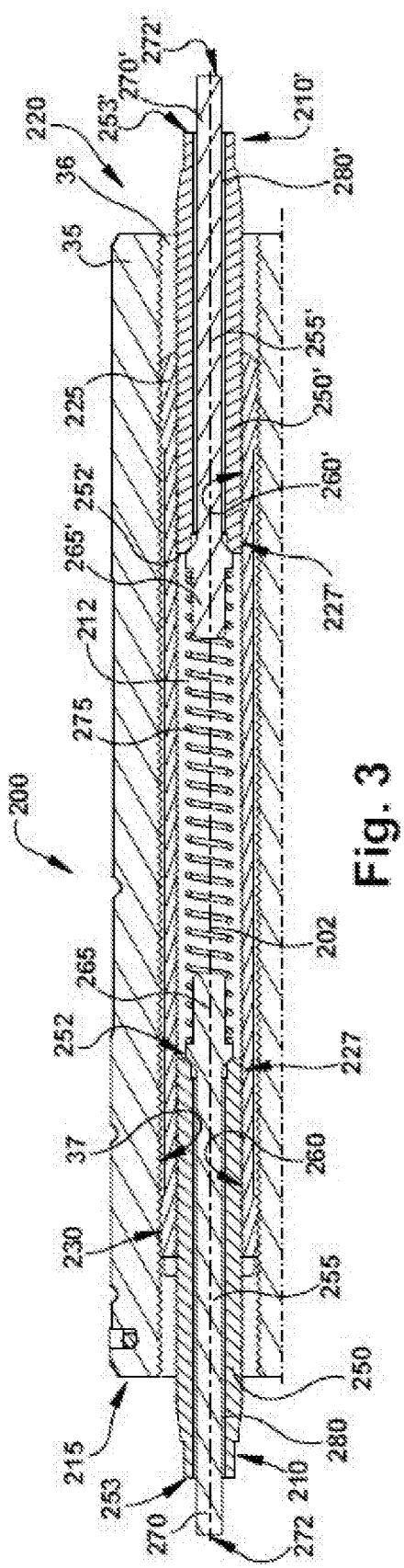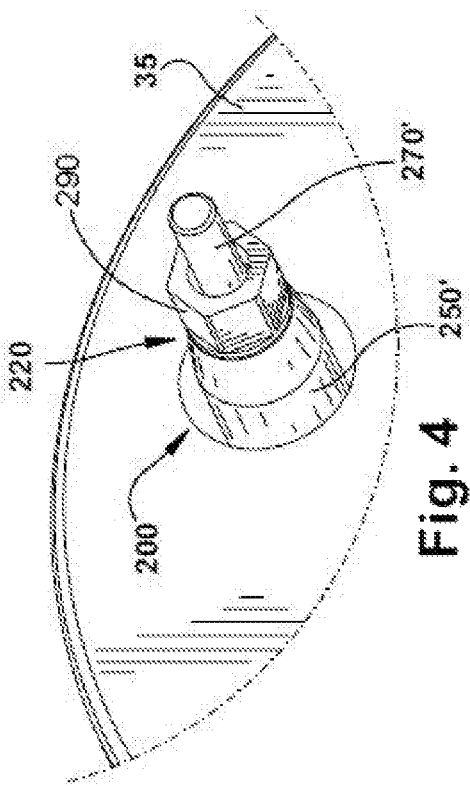

US 10,550,861 B2

MANUALLY ADJUSTABLE POPPET VALVES FOR A POWER ASSIST STEERING GEAR

FIELD OF THE INVENTION

The present invention relates to steering gear assemblies and, in particular, manually adjustable poppet valves for a hydraulic power assist steering gear.

BACKGROUND TO THE INVENTION

Power assist steering gears for a vehicle steering system are known. A power assist steering gear may include a housing that defines a fluid chamber. A piston divides the fluid chamber into a first portion and a second portion. A fluid flow control valve directs pressurized fluid into one of the first or second portions of the fluid chamber, thereby causing linear movement of the piston relative to the housing. The piston is connected with a steering linkage to effect steering movement of vehicle wheels upon linear movement of the piston. The fluid flow control valve is actuated by an input shaft that is controlled be a vehicle operator.

A vehicle may be provided with steering stops that limit the maximum steering movement of the vehicle wheels. The power assist steering gear is typically provided with a pressure relief assembly that is arranged to prevent damage to vehicle components once the steering stops are reached. One implementation of a pressure relief assembly includes first and second poppet valves.

The first and second poppet valves can be adjusted to relieve pressure in the housing just prior to parts of the steering system engaging the steering stops, thereby limiting further steering movement at a predetermined position. Although automatically adjusting poppet valves are available, it is sometimes desirable to use manually adjustable poppet valves in order to maximize steering travel and allow for easier correction of any errors that may occur during assembly of the power assist steering gear. However, due to the arrangement of the power assist steering gear, access to one of the manual poppet valves can be difficult, thereby complicating adjustment of that manual poppet valve.

SUMMARY OF THE INVENTION

According to one aspect of the invention, a steering gear is disclosed. The steering gear includes a housing defining a chamber. A piston divides the chamber into first and second chamber portions. The piston is moveable along a linear axis relative to the housing upon pressurization of fluid in one of the first and second chamber portions. A pressure relief vents pressurized fluid from one of the first and second chamber portions to one other of the first and second chamber portions upon movement of the piston to a predetermined position. The pressure relief assembly includes a first valve at a first end of the pressure relief assembly and a second valve at a second end of the pressure relief assembly. The pressure relief assembly is axially movable relative to the piston to adjust the position of the first valve and the second valve relative to the piston.

According to another aspect of the invention, a steering gear is disclosed. The steering gear includes a housing defining a chamber. A piston divides the chamber into first and second chamber portions. The piston is movable along a linear axis relative to the housing upon pressurization of fluid in one of the first and second chamber portions. A pressure relief assembly vents pressurized fluid from one of the first and second chamber portions to one other of the first and second chamber portions upon movement of the piston to a predetermined position. The pressure relief assembly includes a sleeve having external threads in engagement with internal threads provided in the piston. The sleeve carries a first valve at a first end of the piston and a second valve at a second end of the piston.

BRIEF DESCRIPTION OF THE DRAWINGS

Embodiments of the invention will now be described by way of example only, with reference to the accompanying drawings, in which:

FIG. 3 is an enlarged cross sectional view of a pressure relief assembly having manually adjustable fluid pressure relief poppet valves used in the steering gear of FIG. 1; and FIG. 4 is a perspective view of a portion of the pressure relief assembly of FIG. 3.

DETAILED DESCRIPTION

Figure 1:
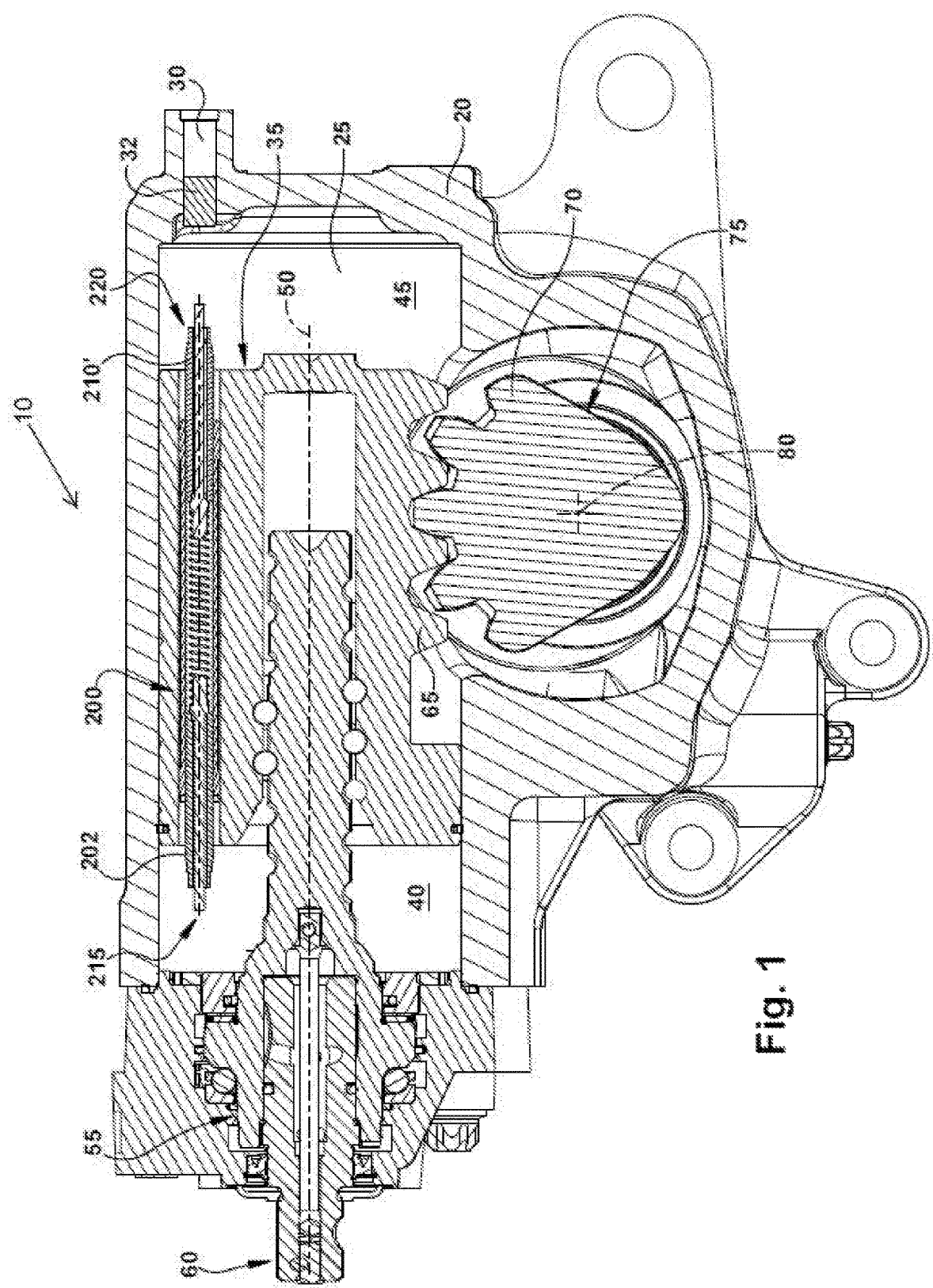
FIG. 1 is a cross sectional of a hydraulic power assist steering gear in accordance with the present invention with a piston in a first position.
Figure 2:
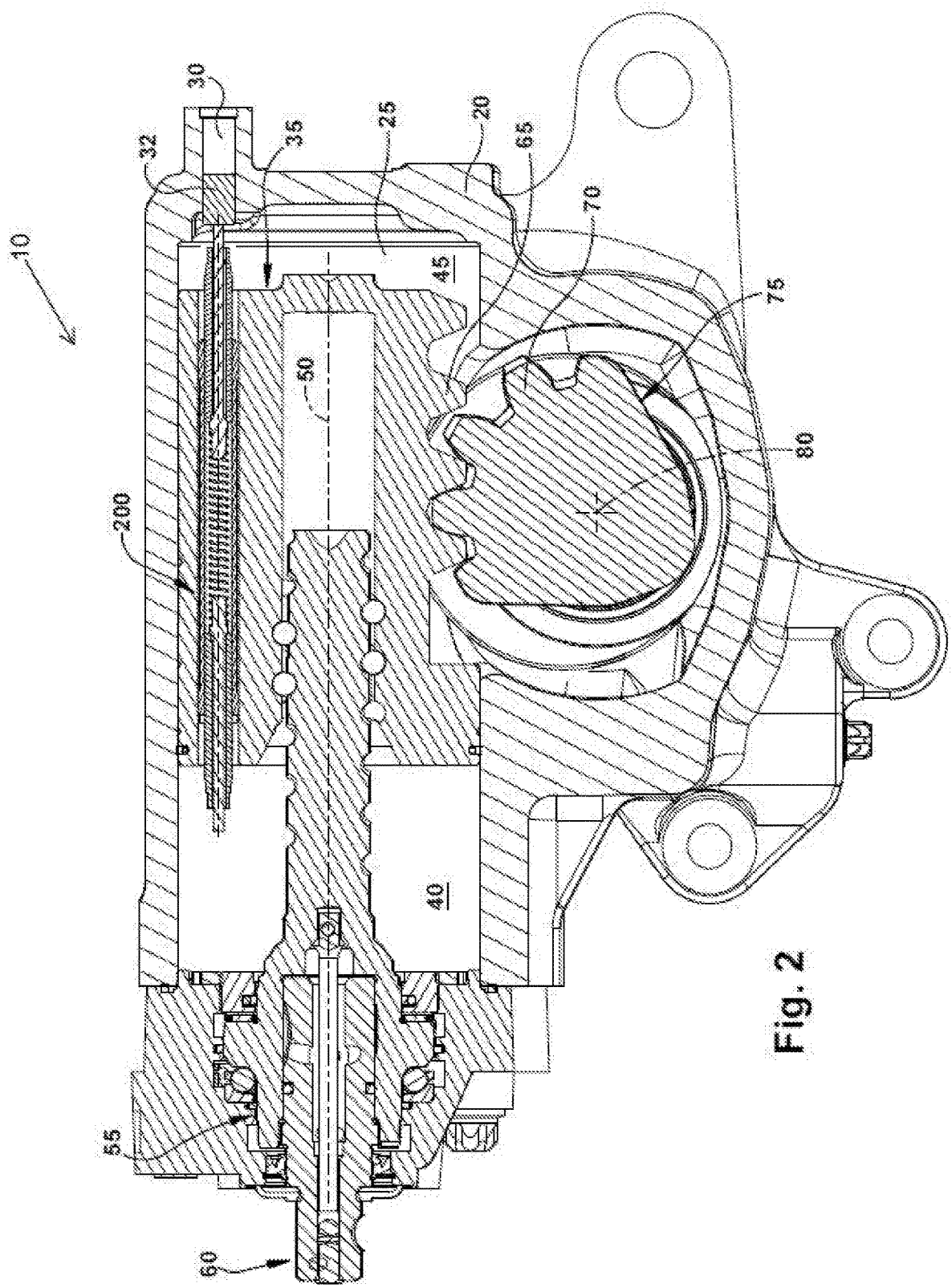
FIG. 2 is a view of the steering gear of FIG. 1 with the piston in a second position.

A power assist steering gear 10 for a vehicle is shown in FIGS. 1 and 2. The steering gear 10 includes a housing 20. The housing 20 defines a fluid chamber 25. An access port 30 provided on the housing 20 provides access to the fluid chamber 25. An access plug 32 is received in the access port 30. A piston 35 is located in the fluid chamber 25. The piston 35 divides the fluid chamber 25 into a first chamber portion 40 and a second chamber portion 45.

Selective pressurization and venting of fluid in the first and second chamber portions 40, 45 moves the piston 35 in the fluid chamber 25 along an axis 50. A fluid flow control valve 55 controls the pressurization and venting of the first and second chamber portions 40, 45. The fluid flow control valve 55 is connected to an input shaft 60. The input shaft 60 is connected with a steering wheel (not illustrated) of the vehicle. Rotation of the steering wheel actuates the fluid flow control valve 55 to pressurize and vent fluid. The piston 35 moves along the axis 50 to the right (as viewed in FIGS. 1 and 2) when fluid is pressurized in the first chamber portion 40 and vented from the second chamber portion 45. For example, when comparing FIGS. 1 and 2, it is apparent that the piston 35 has been moved along to the axis 50 to the right by pressurization of fluid in the first chamber portion 40. The piston 35 moves along the axis 50 to the left (as viewed in FIGS. 1 and 2) when fluid is pressurized in the second chamber portion 45 and vented from the first chamber portion 40.

Gear teeth 65 are formed on an exterior surface of the piston 35. The gear teeth 65 on the piston 35 mesh with gear teeth 70 formed on a sector gear 75. The housing supports the sector gear 75 for rotation about an axis 80. Linear movement of the piston 35 along the axis 50 causes the sector gear 75 to rotate about the axis 80. Thus, as viewed in FIG. 1, movement of the piston 35 to the right along the axis 50 causes the sector gear 75 to rotate clockwise about the axis 80. Movement of the piston 35 to the left along the axis 50 causes the sector gear 75 to rotate counter clockwise about the axis 80. The sector gear 75 is connected with a part of an unillustrated steering mechanism (e.g., pitman arm) to cause the steerable wheels of a vehicle to turn upon rotation of the sector gear 75 about the axis 80.

A pressure relief assembly 200 for the power assist steering gear 10 is shown in detail in FIGS. 3 and 4. The pressure relief assembly 200 limits movement of the piston 35 along the axis 50. The pressure relief assembly 200 extends along a central axis 202 that is substantially parallel to the axis 50 along which the piston 35 moves. Manually adjustable first and second fluid pressure relief poppet valves 210, 210' are provided at opposite first and second ends 215, 220 of the pressure relief assembly 200, respectively. As will be explained in detail below, the poppet valves 210, 210' vent fluid pressure in one of the chamber portions 40, 45 upon movement of the piston 35 along the axis 50 to a predetermined position relative to the housing 20. As a result of venting the fluid pressure, damage to components of the vehicle is prevented.

The pressure relief assembly 200 includes a sleeve 225 extending inside a passage 36 in the piston 35. The sleeve 225 has external threads 230 that engage internal threads 37 provided in the piston 35. In one example, the external threads 230 are only provided toward terminal ends of the sleeve 225. However, it is contemplated that the external threads 230 may be provided along the entire length of the sleeve 225. The poppet valves 210, 210' extend inside the sleeve 225. The sleeve 225 carries the poppet valves 210, 210' at axially opposite ends of the piston 35. A fluid space 212 separates the poppet valves 210, 210'.

Each of the poppet valves 210, 210' are of identical construction. Thus, only the first poppet valve 210 will be described in detail. The same reference numerals will be used to designate like parts of the poppet valves 210, 210', with a prime (') being added to the reference numerals used to designate parts of the second poppet valve 210'.

The poppet valve 210 includes a valve seat 250 and a valve member 255. The valve seat 250 has external threads 260 that engage internal threads 227 provided in the sleeve 225. The valve member 255 has a head 265 and a stem 270. A portion of the head 265 engages a surface 252 of the valve seat 250 to block fluid flow through the poppet valve 210. A spring 275 biases the head 265 into engagement with the valve seat surface 252. The single spring 275 biases both the head 265 of the first poppet valve 210 and the head 265' of the second poppet valve 210' into engagement with the respective valve seat surface 252, 252'. Fluid flow through the poppet valve 210 is allowed when the head 265 moves out of engagement with the valve seat surface 252.

The stem 270 of the valve member 255 extends through the valve seat 250. A radial clearance between the stem 270 and the valve seat 250 defines a fluid passage 280. The stem 270 has a tip portion 272 that projects beyond an end portion 253 of the valve seat 250 when the head 265 engages the valve seat surface 252.

During operation of the power assist steering gear 10, when fluid pressure acts in the first chamber portion 40, the piston 35 moves to the right (as viewed in FIG. 1) relative to the housing 20 along the axis 50. The fluid pressure in the first chamber portion 40 acts on the tip portion 272 and also part of the head 265 (via the fluid passage 280) of the first poppet valve 210, thereby tending to move the head 265 to the right relative to the valve seat surface 252. When the force of the fluid pressure acting on the tip portion 272 and the head 265 is sufficiently large enough to overcome the bias of the spring 275, the head 265 moves away from the valve seat surface 252. As a result, the fluid pressure in the first chamber portion 40 is communicated through the first poppet valve 210 and into the fluid space 212. Due to the fact that the head 265' of the second poppet valve 210' remains engaged with the respective valve seat surface 252', the fluid pressure is not communicated through the second poppet valve 210'. Thus, the fluid pressure remains substantially trapped in the first chamber portion 40. The trapped fluid pressure moves the piston 35 to the right relative to the housing 20 along the axis 50. Movement of the piston 35 to the right results in rotation of the sector gear 75 about the axis 80, which thereby causes the steerable wheels of the vehicle to turn.

Upon continued movement of the piston 35 along the axis 50, the tip portion 272' of the stem 270' of the second poppet valve 210' eventually engages the access plug 32 as the piston 35 nears the right end of the fluid chamber 25 (as shown in FIG. 2). As a result, further movement of the piston 35 along the axis 50 to the right causes the valve member 255' of the second poppet valve 210' to move relative to the respective valve seat 250', thereby causing the head 265' to move away from the valve seat surface 252'. As understood by those skilled in the art, the valve member 255' remains substantially stationary relative to the housing 20 upon engagement with the access plug 32, and the relative movement between the valve member 255' and the valve seat 250' is a result of movement of the piston 35 relative to the housing 20.

The movement of the head 265' out of engagement with the valve seat surface 252' allows for fluid pressure in the fluid space 212 communicated from the first chamber portion 40 to flow through the fluid passage 280' of the second poppet valve 210' and into the second chamber portion 45. The fluid pressure which is then vented through the control valve 55 via unillustrated passages. The fluid pressure moving the piston 35 to the right is thus vented, thereby preventing further hydraulically assisted movement of the piston 35 to the right. It is apparent that, if the piston 35 moves to the left along the axis 50 by fluid pressure acting in the second chamber portion 45, such fluid pressure in the second chamber portion 45 can be communicated to the first chamber portion 40 and subsequently vented through the control valve 55 in a manner similar to the above described process.

The predetermined position of the piston 35 at which point the poppet valves 210, 210' vent fluid pressure to limit axial movement of the piston 35 can be adjusted by moving the poppet valves 210, 210' relative to the piston 35. This adjustment process will now be explained.

First, the access plug 32 is removed to gain access to the fluid chamber 25 via the access port 30 and thus the second end 220 of the pressure relief assembly 200. Then, a first tool engages the sleeve 225 at the second end 220 of the pressure relief assembly 200. The sleeve 225 may be provided with one or more features that facilitate engagement between the tool and the sleeve (e.g., slots). Next, the first tool rotates the sleeve 225 relative to the piston 35. Rotation of the sleeve 225 relative to the piston 35 causes the sleeve 225 to move axially relative to the piston 35, thereby causing likewise movement (both rotational and axial) of the first poppet valve 210 and also the second poppet valve 210'. The sleeve 225 is rotated until the first poppet valve 210 is in a desired axial position relative to the piston 35.

After the first poppet valve 210 is in the desired axial position, the first tool is removed from engagement with the sleeve 225 and a second tool engages the sleeve 225. The second tool may by the same tool as the first tool. Again, the sleeve 225 may be provided with one or more features that facilitate engagement between the second tool and the sleeve 225. The features may be the same features used to facilitate engagement between the first tool and the sleeve 225 during rotation of the sleeve 225. The second tool prevents the sleeve 225 from moving relative to the piston 35.

Next, a third tool engages the valve seat 250' of the second poppet valve 210' at the second end 220 of the pressure relief assembly 200. The valve seat 250' may be provided with one or more features that facilitate engagement between the third tool and the valve seat 250'. For example, referring to FIG. 4, an end portion of the valve seat 250' can be provided with flat portions 290 arranged to give a hexagon cross section. It is contemplated that the flat portions 290 may be arranged to give cross sectional shapes other than hexagon. With the second tool preventing the sleeve 225 from moving relative to the piston 35, the third tool rotates the valve seat 250' of the second valve 210' relative to the sleeve 225 and the piston 35. Due to the fact that movement of the sleeve 225 is prevented, rotation of the valve seat 250' relative to the sleeve 225 and the piston 35 results in the second poppet valve 210' moving axially relative to the sleeve 225 and the piston 35. The valve seat 250' rotates relative to the sleeve 225 until the second poppet valve 210' is in a desired axial position relative to the piston 35. The desired axial position of the first poppet valve 210 is maintained during positioning of the second poppet valve 210' due to the fact that movement of the sleeve 225 relative to the piston 35 is prevented.

Once the desired axial positions of the first poppet valve 210 and the second valve 210' are set, the third tool is removed from the valve seat 250' of the second poppet valve 210' and the second tool is removed from the sleeve 225. Finally, the access plug 32 is replaced in the access port 30. The power assist steering gear 10 is thus adjusted and ready for operation. It is contemplated that, once the power assist steering gear 10 is installed in a vehicle, the above process can be executed to provide desired adjustments without the need to remove the power assist steering gear 10 from the vehicle.

Thus, the above described invention allows for adjustment of both the first poppet valve 210 and the second poppet valve 210' from a single side of the power assist steering gear 10. Specifically, both of the poppet valves 210, 210' can be adjusted via the limited access granted by the access port 30. What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

The invention claimed is:

1. A steering gear comprising:
   a housing defining a chamber;
   a piston dividing the chamber into first and second chamber portions, the piston being moveable along a linear axis relative to the housing upon pressurization of fluid in one of the first and second chamber portions; and
   a pressure relief assembly for venting pressurized fluid from one of the first and second chamber portions to one other of the first and second chamber portions upon movement of the piston to a predetermined position, the pressure relief assembly including a first valve at a first end of the pressure relief assembly and a second valve at a second end of the pressure relief assembly, the pressure relief assembly being axially movable relative to the piston to simultaneously adjust the position of both the first valve and the second valve relative to the piston.

2. The steering gear of claim 1, wherein each of the first valve and the second valve is a poppet valve having a valve seat and a valve member extending through the valve seat.

3. A steering gear comprising:
   a housing defining a chamber;
   a piston dividing the chamber into first and second chamber portions, the piston being moveable along a linear axis relative to the housing upon pressurization of fluid in one of the first and second chamber portions; and
   a pressure relief assembly for venting pressurized fluid from one of the first and second chamber portions to one other of the first and second chamber portions upon movement of the piston to a predetermined position, the pressure relief assembly including a first valve at a first end of the pressure relief assembly and a second valve at a second end of the pressure relief assembly, the pressure relief assembly being axially movable relative to the piston to adjust the position of the first valve and the second valve relative to the piston, the pressure relief assembly including a sleeve extending into the piston, each of the first valve and the second valve being a poppet valve having a valve seat and a valve member extending through the valve seat, the sleeve being movable relative to the piston, movement of the sleeve relative to the piston resulting in movement of both the first valve and the second valve relative to the piston.

4. The steering gear of claim 3, wherein a spring is provided to bias the valve member of the first valve into engagement with the valve seat of the first valve and to bias the valve member of the second valve into engagement with the valve seat of the second valve.

5. The steering gear of claim 2, wherein a spring is provided to bias the valve member of the first valve into engagement with the valve seat of the first valve and to bias the valve member of the second valve into engagement with the valve seat of the second valve.

6. The steering gear of claim 1 comprising a fluid control valve configured to control pressurization of fluid in the first and second chamber portions.

7. The steering gear of claim 6 comprising an input shaft, the fluid control valve being actuated and controlling the pressurization of fluid in the first and second chamber portions in response to movement of the input shaft.

8. The steering gear of claim 4, wherein the pressure relief assembly is configured to allow for axial movement of at least one of the first valve and the second valve relative to the sleeve and axial movement of the sleeve relative piston via manipulation of only one of the first end and the second end of the pressure relief assembly.

9. A steering gear comprising:
   a housing defining a chamber;
   a piston dividing the chamber into first and second chamber portions, the piston being movable along a linear axis relative the housing upon pressurization of fluid in one of the first and second chamber portions; and
   a pressure relief assembly for venting pressurized fluid from one of the first and second chamber portions to one other of the first and second chamber portions upon movement of the piston to a predetermined position, the pressure relief assembly including a sleeve having external threads in engagement with internal threads provided in the piston, the sleeve carrying a first valve at a first end of the piston and a second valve at a second end of the piston.

10. The steering gear of claim 9, wherein rotation of the sleeve relative to the piston adjusts the axial position of the first valve and the second valve relative to the piston.

11. The steering gear of claim 10, wherein each of the first valve and the second valve is a poppet valve having a valve seat and a valve member extending through the valve seat, the valve seat having external threads in engagement with internal threads provided in the sleeve.

12. The steering gear of claim 11, wherein rotation of one of the first valve and the second valve relative to the sleeve adjusts the axial position of the one of the first valve and the second valve relative to the sleeve.

13. The steering gear of claim 11, wherein a spring is provided to bias the valve member of the first valve into engagement with the valve seat of the first valve and to bias the valve member of the second valve into engagement with the valve seat of the second valve.

14. The steering gear of claim 9 comprising a fluid control valve configured to control pressurization of fluid in the first and second 1.

15. The steering gear of claim 14 comprising an input shaft, the fluid control valve being actuated and controlling the pressurization of fluid in the first and second chamber portions in response to movement of the input shaft.

* * * * *